Oct. 8, 1929.                E. P. RULLMANN                1,730,901
                             AUTOMOBILE SIGNAL
                            Filed June 22, 1926
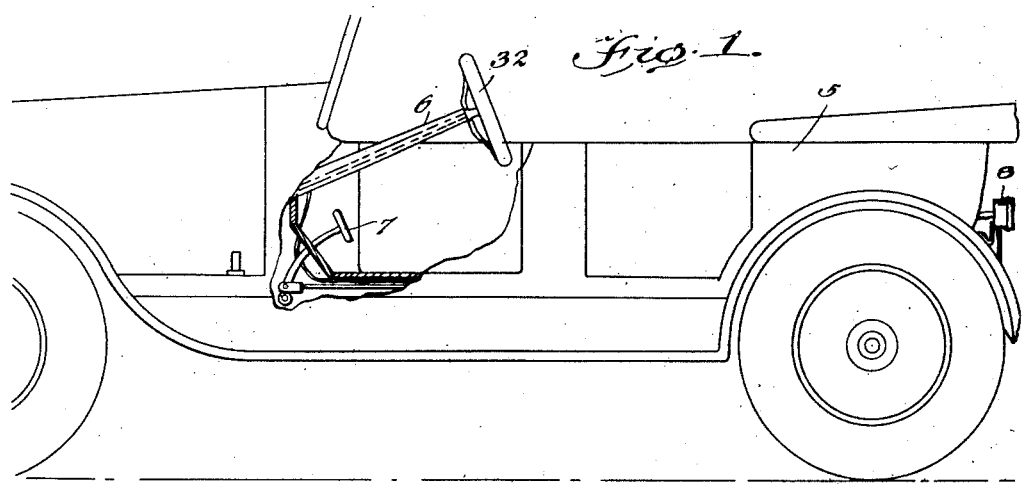
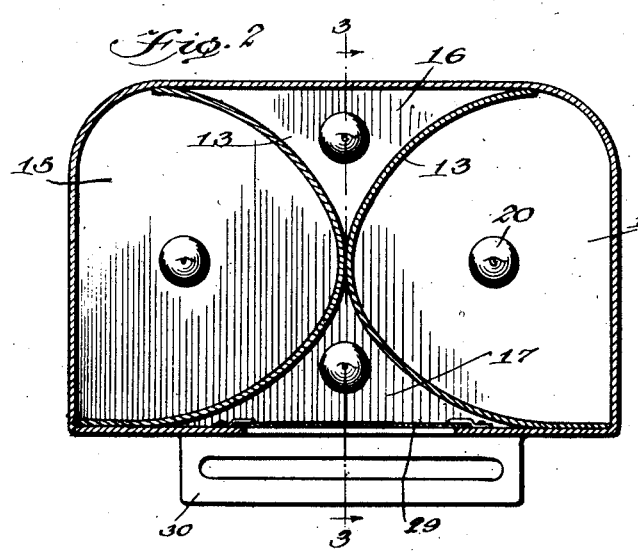
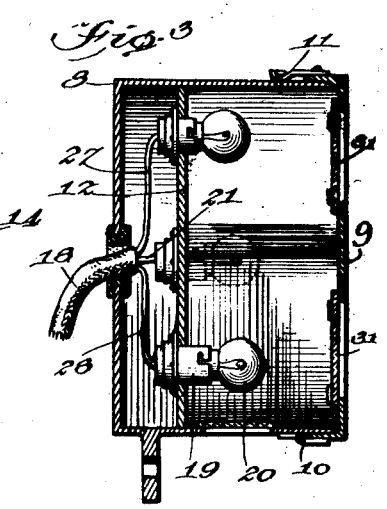
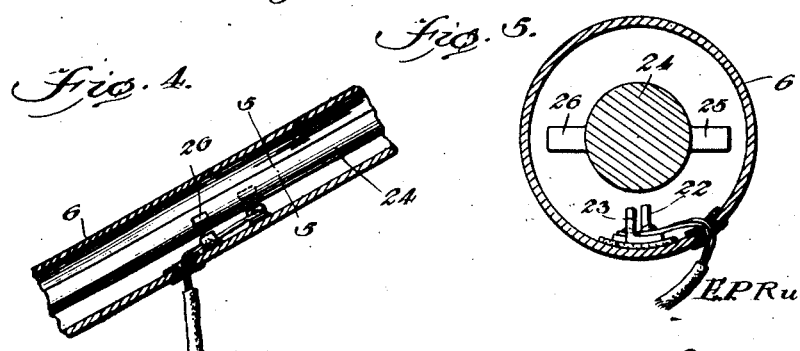

Patented Oct. 8, 1929

1,730,901

UNITED STATES PATENT OFFICE

EDWARD P. RULLMANN, OF MILWAUKEE, WISCONSIN

AUTOMOBILE SIGNAL

Application filed June 22, 1926. Serial No. 117,782.

My invention relates to automobile signals and has for its object to provide an electrically operated signal device comprising signals for indicating when the operator of the vehicle is turning in either a right or left direction as well as a signal for indicating when the operator intends to stop the vehicle.

A further object is to provide a single housing for each of the above mentioned signalling devices in combination with the rear running or tail light of the automobile.

Another object is to provide a neat appearing and efficiently operating device of this character which is simple in construction, inexpensive to manufacture and which may be installed on practically all types of automobiles.

Other objects and advantages will become apparent from the following detailed description when viewed together with the accompanying drawing forming part hereof, wherein like numerals refer to like parts throughout the specification and in which Figure 1 is a fragmentary view of an automobile, with parts broken away and showing the relative position for mounting my signal, Figure 2 is a view in rear elevation showing the various compartments for the signal lamps, Figure 3 is a view taken along a line 3—3 of Figure 2, Figure 4 is a longiudinal sectional view of a portion of the steering post showing the signal contact members, and Figure 5 is a view taken along a line 5—5 of Figure 4.

Referring now to the drawing wherein for the purpose of illustration I have disclosed a preferred embodiment of my invention, the numeral 5 designates generally a conventional type of automobile having a steering column 6 and a foot brake lever 7. At the rear of the automobile, preferably on the left rear fender, I attach a signal housing 8, the housing being of any suitable size and shape and having a cover plate 9 hingedly mounted at 10 to the front thereof and secured to the top portion of the housing by a snap fastener 11. The interior of the housing is divided into front and rear compartments by a vertical partition 12. The front compartment is further divided into smaller compartments by a pair of semi-circular partitions 13 which are formed of spring-like strips of metal of a width equal to the depth of the front compartment and having their ends spring pressed against the top and bottom walls of the housing and with their intermediate sections in abutting relation at approximately the center line of the housing. The smaller compartments thus formed by the partitions 13 comprise the right and left signal compartments 14 and 15 respectively, and the partitions 13 aid further in dividing the housing into upper and lower compartments 16 and 17 respectively.

The back of the housing is provided with an opening through which an electric cable 18 is inserted extending from the battery of the automobile.

The vertical partition 12 is provided with openings within which electric light sockets 19 are fitted having electric light bulbs 20 carried therein, one of said bulbs being arranged in each of the smaller compartments. The bulb carried in the compartment 14 is operated through an electric wire 21 which extends through the cable to a contact post 22 secured at the inside of the housing of the steering column 6 and the bulb arranged in the compartment 15 is similarly connected to the contact 23 likewise carried within the housing of the steering column. The steering post 24 is provided with contact arms 25 and 26 respectively, the arm 25 being arranged so that the turning of the steering wheel 27 of the automobile will operate to engage the arm 25 with the contact post 22. When the steering wheel is turned in the opposite direction the arm 26 will engage the contact member 23. The electric wiring carried in the cable 18 is connected with the battery of the automobile and the cable then extends to the contact members carried within the housing so that the engagement of the arms with the contact member operates to complete the electrical circuit and thus cause the bulbs to be lit, the circuit being grounded through the steering post 24.

The bulb in the compartment 16 constitutes the stop light of the automobile and is connected to the battery by a wire 27 through any suitable switch which is closed by the operating of the foot brake lever 7.

The bulb carried in the compartment 17 constitutes the rear running light of the automobile and is connected through a wire 28 with the light circuit of the car. The bottom wall of the housing is provided with an opening to within the compartment 17 across which is fitted a glass cover 29 for the purpose of illuminating the license tag which may be carried on the license bracket 30.

The cover 9 on the housing is provided with openings having glass covers 31 for each of the compartments and it is to be understood that such glass covers may be of any suitable color.

I claim:

A signal lamp comprising a casing cast integral with a back portion and open face, a pair of removable spring held semi-circular partitions arranged within the casing with their intermediate sections in abutting relation and defining smaller signal lamp compartments including upper, lower and side compartments, each of said smaller compartments having one side opening toward the open face of the casing, said open face of the casing having a removable cover arranged thereon forming a closure for all of said compartments and a vertical partition arranged in the casing in spaced relation from the rear wall thereof and disposed at the rear edges of the semi-circular partitions whereby to define the rear wall for the compartments.

In testimony whereof I affix my signature.

EDWARD P. RULLMANN.